US010329153B2

United States Patent
Lehmkuhl et al.

(10) Patent No.: US 10,329,153 B2
(45) Date of Patent: Jun. 25, 2019

(54) METHOD FOR PURIFYING RAW PHOSPHORIC ACID (E.G. MGA ACID) BY ADDING ASHES ORIGINATING FROM WASTE INCINERATION PLANTS, COMPRISING THE PRODUCTION OF PURE PHOSPHORIC ACID, CALCIUM SULFATE, WATER-SOLUBLE CALCIUM HYDROGEN PHOSPHATES AND METAL SALT SOLUTION

(71) Applicant: Remondis Aqua GmbH & Co. KG, Lünen (DE)

(72) Inventors: Josef Lehmkuhl, Haltern am See (DE); Martin Lebek, Burgdorf (DE)

(73) Assignee: REMONDIS AQUA GMBH & CO. KG, Lünen (DE)

( * ) Notice: Subject to any disclaimer, the term of this patent is extended or adjusted under 35 U.S.C. 154(b) by 0 days.

(21) Appl. No.: 15/308,323

(22) PCT Filed: May 20, 2014

(86) PCT No.: PCT/EP2014/001360
§ 371 (c)(1),
(2) Date: Nov. 1, 2016

(87) PCT Pub. No.: WO2015/165481
PCT Pub. Date: Nov. 5, 2015

(65) Prior Publication Data
US 2017/0050848 A1    Feb. 23, 2017

(30) Foreign Application Priority Data

May 2, 2014    (DE) .................. 10 2014 006 278

(51) Int. Cl.
*C01B 25/234*    (2006.01)
*C01F 11/46*    (2006.01)
(Continued)

(52) U.S. Cl.
CPC .......... *C01B 25/234* (2013.01); *C01B 25/324* (2013.01); *C01F 11/46* (2013.01);
(Continued)

(58) Field of Classification Search
CPC ..... C01B 25/234; C01B 25/324; C01F 11/46; C02F 1/42; C02F 1/5245; C02F 2001/425;
(Continued)

(56) References Cited

U.S. PATENT DOCUMENTS 3,006,754 A    10/1961    Sullivan
3,607,016 A *  9/1971    Barilli .................. C01B 33/103
                                             423/332
(Continued)

FOREIGN PATENT DOCUMENTS

DE    32 10575 A1    10/1983
EP    0 023 195 A2    1/1981
JP    S53-075196 A    7/1978

OTHER PUBLICATIONS

M. Franz, "Phosphate fertilizer from sewage sludge ash (SSA)", Waste Management, Jan. 1, 2008, pp. 1809-1818, vol. 28, No. 10, Elsevier, New York, NY, US.
(Continued)

*Primary Examiner* — Ngoc-Yen Nguyen
(74) *Attorney, Agent, or Firm* — John P. White; Cooper & Dunham LLP

(57) ABSTRACT

The present invention relates to a method for purifying raw phosphoric acid by adding ashes originating from waste incineration plants, as well as calcium hydroxide and at least one sulfide, and by wet-chemical digestion for obtaining (producing) calcium sulfate, pure phosphoric acid, metal salt solution and/or calcium hydrogen phosphates (e.g. triple superphosphate).

19 Claims, 2 Drawing Sheets

(51) Int. Cl.
- *C02F 1/42* (2006.01)
- *C02F 3/30* (2006.01)
- *C01B 25/32* (2006.01)
- *C05B 1/04* (2006.01)
- *C05B 17/00* (2006.01)
- *C02F 1/52* (2006.01)
- *C02F 101/10* (2006.01)

(52) U.S. Cl.
CPC .............. *C02F 1/42* (2013.01); *C02F 1/5245* (2013.01); *C02F 3/305* (2013.01); *C05B 1/04* (2013.01); *C05B 17/00* (2013.01); *C01P 2006/80* (2013.01); *C02F 2001/425* (2013.01); *C02F 2101/105* (2013.01); *C02F 2303/16* (2013.01)

(58) Field of Classification Search
CPC ............... C02F 2101/105; C02F 2303/16; C02F 3/305; C05B 17/00; C05B 1/04
See application file for complete search history.

(56) References Cited

U.S. PATENT DOCUMENTS

| | | | | |
|---|---|---|---|---|
| 3,650,691 A | * | 3/1972 | Reulecke | B01J 39/00 423/320 |
| 4,248,617 A | | 2/1981 | Kamo | |
| 4,378,340 A | * | 3/1983 | Berglund | C01B 25/238 423/101 |
| 4,389,380 A | * | 6/1983 | Parks | C01B 25/01 423/157.2 |
| 4,479,923 A | * | 10/1984 | Sardisco | C01B 25/322 423/166 |
| 4,554,144 A | * | 11/1985 | Ore' | C01B 25/238 423/116 |
| 4,851,199 A | * | 7/1989 | Young | C01G 31/00 423/321.1 |

OTHER PUBLICATIONS

International Search Report in connection with PCT International Application No. PCT/EP2014/001360, dated Nov. 24, 2014.

* cited by examiner

Production of raw phosphoric acid
Phosphoric acid as a basic product for all phosphates

Until now: phosphoric acid and P-fertilizer originate from rock

The alternative: phosphoric acid and P-fertilizer are produced from MGA acid

METHOD FOR PURIFYING RAW PHOSPHORIC ACID (E.G. MGA ACID) BY ADDING ASHES ORIGINATING FROM WASTE INCINERATION PLANTS, COMPRISING THE PRODUCTION OF PURE PHOSPHORIC ACID, CALCIUM SULFATE, WATER-SOLUBLE CALCIUM HYDROGEN PHOSPHATES AND METAL SALT SOLUTION

CROSS-REFERENCE TO RELATED APPLICATIONS

This application is a § 371 national stage of PCT International Application No. PCT/EP2014/001360, filed May 20, 2014, claiming priority of German Patent Application No. DE 10 2014 006 278.3, filed May 2, 2014, the content of each of which is hereby incorporated by reference into the application.

The invention relates to a method for purifying raw phosphoric acid, e.g. (MGA acid) by adding aluminum and iron-containing ashes originating from waste incineration plants with a subsequent production of pure phosphoric acid, calcium sulfate, water-soluble calcium hydrogen phosphates and acidic metal salt solutions.

Raw phosphates (rock) are required for the production of fertilizers. Large deposits are located mainly in North Africa (Morocco, Algeria, Israel, Jordan). In Europe there are no significant occurrences of raw phosphate. It is well known that, in order to be able to replace the finite raw phosphates, the recovery of phosphorus or phosphates from wastes and waste water is intended in the European industrial countries. This is also appropriate, because the raw phosphates are increasingly contaminated with heavy metals, such as cadmium, copper, arsenic and uranium (partly radioactive), and these contaminants are found again in the fertilizers and ground water. In the coalition agreement of December 2013, the German Federal Government stated: "The protection of ground water from nutrient inputs and pollutants should be strengthened and legally tailored, so that incorrect developments can be corrected. We will terminate the sewage sludge production for fertilizer purposes and recover phosphorus and other nutrients".

A major phosphate resource in Europe is the waste water from municipal and industrial sewage treatment plants. In Germany alone, approximately 50,000 Mg (t) phosphorus enter the waste water each year and are for the most part precipitated as metal salts, using precipitating agents such as iron or aluminium salts, and are removed with the sewage sludge. Nowadays, the phosphate-containing sewage sludges are mostly being incinerated and the ultimately obtained ash is disposed or "misappropriated" elsewhere (e.g. road construction, backfilling), since the phosphorus included therein is—with a few exceptions including pilot facilities—not recovered.

Similar to other industrial recycling processes, such as the recovery of iron from scrap, the recycling of paper from waste paper, the recovery of copper and other metals from electrical equipment, an industrial recovery of phosphorus from waste is also possible. A crucial prerequisite therefore is that the phosphorus-containing residues show a sufficiently high concentration of phosphorus, exhibit low contamination and essentially correspond to the currently applied raw phosphates.

Phosphates are obtained from raw phosphate (rock, with a phosphate content of approximately 30% $P_2O_5$ and a calcium content of approximately 50% CaO) by digestion with sulfuric acid. The impurities of the raw phosphates are found to a large extent also in the recovered raw phosphoric acid, which is also referred to as "green acid" or "MGA" (Merchant Grade Acid). Since in Europe phosphate fertilizers are produced from imported rock and imported MGA phosphoric acid, the heavy metal contamination in the fertilizers is significant. Rock and MGA phosphoric acid contain for example:

|  |  | Rock | MGA acid |
|---|---|---|---|
| Arsenic | As | 9 | 5 |
| Cadmium | Cd | 26 | 24 |
| Chromium | Cr | 58 | 120 |
| Copper | Cu | 37 | 46 |
| Nickel | Ni | 55 | 24 |
| Uranium | U | 123 | 210 |

(All values in mg/kg rock or acid)

In the fertilizer production, rock and MGA phosphoric acid are mixed together (granulated), wherein the water-insoluble rock apatite (tricalcium phosphate) is converted into water-soluble calcium dihydrogen phosphate. A fertilizer obtained in this manner is also referred to as a triple superphosphate:

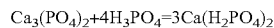
$$Ca_3(PO_4)_2 + 4H_3PO_4 = 3Ca(H_2PO_4)_2$$

In this process, the heavy metal portions of rock and MGA phosphoric acid add up and the for the most part inert heavy metals are mobilized by the acid as water-soluble salts. Theoretically, purified phosphoric acid can also be used for this process, which however considerably increases the price of fertilizers production, since the purification of MGA phosphoric acid (up to food or feed quality) is very complex.

Therefore, there is a need for new, simpler and more economical methods for purifying MGA phosphoric acid, particularly with respect to the removal of toxic and otherwise harmful heavy metals. Such a method would provide a cost-effective possibility of obtaining/producing phosphates and their derivatives, e.g. phosphate fertilizer, pure phosphoric acid.

The problem is solved very economically and effectively by the method described herein, wherein the impure MGA phosphoric acid is purified by adding ash from waste incineration plants, namely ash which contains calcium, iron and aluminum compounds in the form of their phosphates and silicates. Thus, the raw phosphoric acid is not only purified, but, at the same time, its concentration of phosphorus is also increased. Ashes originating from waste incineration plants contain—when e.g. sewage sludges or animal meals are incinerated—over 10 wt % phosphorus (P), which can be converted to $H_3PO_4$. Corresponding to the molar ratios (molecular weight phosphorus/P=30.98; molecular weight phosphoric acid/$H_3PO_4$=98), 31.6 g of phosphoric acid are formed from 10 g of phosphorus, i.e. 31.6 g $H_3PO_4$ can be obtained from 100 g ash with 10% P.

If ash is dissolved according to the invention in a 30% MGA phosphoric acid in the ratio 1 part ash and 3 parts acid, the $H_3PO_4$ concentration in the eluate increases to more than 35% $H_3PO_4$. On the one hand, the purification effect of the MGA phosphoric acid is achieved by the silicate components of the ash, on the other hand, it is improved by the addition of lime milk (calcium hydroxide suspension) and alkali and/or alkaline earth sulfides (Na sulfide, Ba sulfide), because dissolved heavy metals are additionally precipitated as sulfides and coagulated and integrated into the matrix of the eluted ash, so that the often colloidal metal sulfides can be filtered significantly better. The filtrate or the eluate of phosphoric acid obtained in this manner, which particularly contains calcium in dissolved form apart from small amounts of metal ions, can be further processed in optionally two steps according to the invention:

1. Production of a Ca-hydrogen Phosphate Granulate

According to the invention, calcium hydrogen phosphate granulate ($Ca(H_2PO_4)_2$ (MCP), $CaHPO_4$ (DCP) or mixtures thereof) is obtained by addition of tricalcium phosphate-containing solids ("rock", ashes, e.g. from animal meal) and/or limestone meal or calcium oxide (burnt lime), which can be marketed, for example, as a fertilizer (triple superphosphate=TSP) or feed phosphate (MCP).

$$6H_3PO_4+3CaO=3Ca(H_2PO_4)_2+3H_2O$$

According to the stoichiometry, for 6×98=588 g phosphoric acid are required and for 3×56 g=168 g calcium oxide (alternatively 3×100 g=300 g limestone/$CaCO_3$).

In a mixing unit, preferably in a ploughshare mixer or throwing-paddle mixer, the calcium oxide is added as a reactive powder to the prepared raw phosphoric acid ($H_3PO_4$ concentration 30-35%). This process is strongly exothermic and results in a hot moist granulate, which results in a ripening and cooling process in air-dried granulate, which can preferably be marketed as a triple superphosphate (TSP). In contrast to the conventional fertilizers, which are produced from raw phosphates and MGA acid, the product is considerably less contaminated with heavy metals:

| Triple superphosphate | old | new |
|---|---|---|
| % $P_2O_5$ | 49.5 | 48.6 |
| % CaO | 23.1 | 23.8 |
| ppm Cu | 39 | 6 |
| ppm Cr | 120 | 35 |
| ppm Cd | 18 | <1 |
| ppm U | 184 | 38 |

This approach has an exceptional ecological value. To date, rock (calcium phosphate) and phosphoric acid have been imported into Europe and fertilizer has been produced thereof. According to the method of the invention, it is now possible to use European calcium raw materials (limestones, animal meal ashes), as well as phosphate raw materials (sewage sludge ashes, animal meal ashes). A comparison of the conventional method based on rock and the method according to the invention based on ashes is shown in FIG. 1.

2. Production of Pure Phosphoric Acid and Acidic Metal Salt Solution.

Optionally, first by the addition of sulfuric acid, calcium sulfate (gypsum) is precipitated from the phosphoric acid ash eluate and phosphoric acid is obtained by protolysis.

$$HPO_4^{2-} + Ca^{2+} + H_2SO_4 = CaSO_4\downarrow + H_3PO_4$$

The calcium sulfate precipitate (gypsum) is filtered off in a known manner. The raw acid obtained in this manner still contains dissolved metals, particularly iron and aluminum, which crystallize out as salts with increasing resting time and concentration. For this reason, the raw acid must be freed from the interfering metal ions. Basically, all separation methods are suitable therefore, which can "break down" acidic metal salt solutions into purified (low-metal) acid and concentrated metal salt solutions, using membranes, by electrodialysis, osmosis or with ion exchange resins. The low-metal raw acid can now be concentrated to a concentration of more than 70% $H_3PO_4$ by e.g. vacuum evaporation, without leading to crystallizations.

According to the invention, ion exchange resins can preferably be used for phosphoric acid purification, and the resins loaded with metal ions can be regenerated optionally with salt, sulfur or nitric acid. Although the nitric acid with a pKS value of −1.3 is less strong than the hydrochloric acid with a pKS value of −6, sulfuric acid with a pKS value of −3 (pKS=acid constant) shows surprisingly a sufficient regeneration effect, i.e. the metal ions, particularly iron and aluminum, are re-dissolved as nitrates and the ion exchange resin is charged with H ions again. The iron and aluminum-containing nitrate solution can now be used, according to the invention, in sewage treatment plants equipped with a suitable biological denitrification stage, as precipitating agents for the phosphates dissolved in the waste water. The anion nitrate is converted into air-nitrogen by denitrifying agents and serves the anaerobic bacteria as an oxygen source and energy supplier.

In contrast to the application of iron or aluminum chlorides or sulfates, which are usually used in sewage treatment plants as phosphate precipitating agents, there is no undesirable increasing of salt in the water by acid residues (anions) when metal nitrates are applied. The following chemical reaction equations illustrate this effect:

a) conventional phosphate precipitation in sewage treatment plants:

$$PO_4^{3-}+FeCl_3=FePO_4+3Cl^-$$

$$2PO_4^{3-}+Al_2(SO_4)_3=2AlPO_4+3SO_4^{2-}$$

b) innovative phosphate precipitation:
Step 1: Regeneration of the Ion Exchangers with $HNO_3$ $$Fe^{3+}+Al^{3+}+6HNO_3=Fe(NO_3)_3+Al(NO_3)_3+6H^+$$

Step 2: Phosphate Precipitation $$PO_4^{3-}+Fe(NO_3)_3=FePO_4+3NO_3^-$$

Step 3: Denitrification in the Biology $$2NO_3+6H^++6e^-=N_2+3H_2O$$

Up to date, the use of iron or aluminum nitrate in the waste water purification has not been customary (except for special applications for fighting malodor), because the nitrates are considerably more expensive than the corresponding chlorides or sulfates. According to the invention, the nitrate solution can be obtained "on-site" as a by-product of a phosphoric acid purification and used as diluted solutions for the precipitation of phosphates and as an oxygen supplier for biological waste water purification. If the sewage treatment plant is not equipped for denitrification, salt or sulfuric acid can be applied for resin regeneration.

The entire process for purifying raw phosphoric acid and producing calcium sulfate, calcium hydrogen phosphate, pure phosphoric acid and acidic metal salt solutions is shown in FIG. 2.

In particular, the method according to the invention is designed to be quasi-modular, and the purification of the "green acid" or the MGA from heavy metals is made possible, according to the invention, by sulfide precipitation.

In a first aspect A1, the present invention thus relates to a method for purifying raw phosphoric acid, characterized in that
  a) raw phosphoric acid is reacted with ash, calcium hydroxide and at least one sulfide,
  b) the acid-insoluble portion of the solids is separated, so that a filtrate or eluate is obtained.

Figure 1:
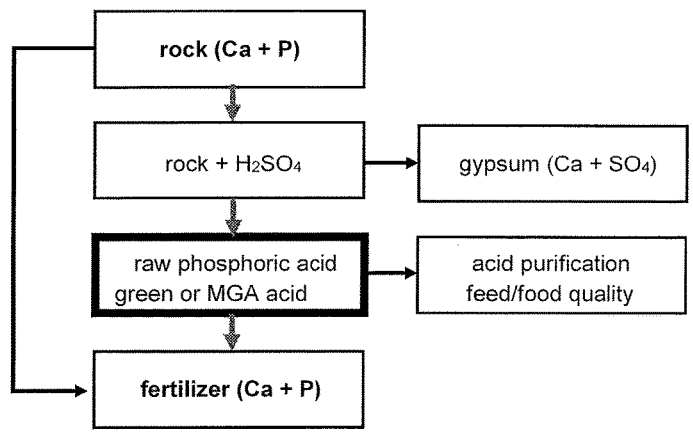
FIG. 1 shows a schematic comparison of the prior art with the method according to the invention.
Figure 1:
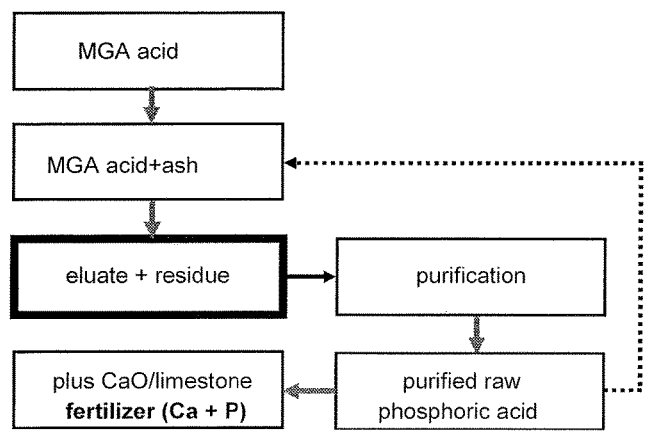
Figure 2:
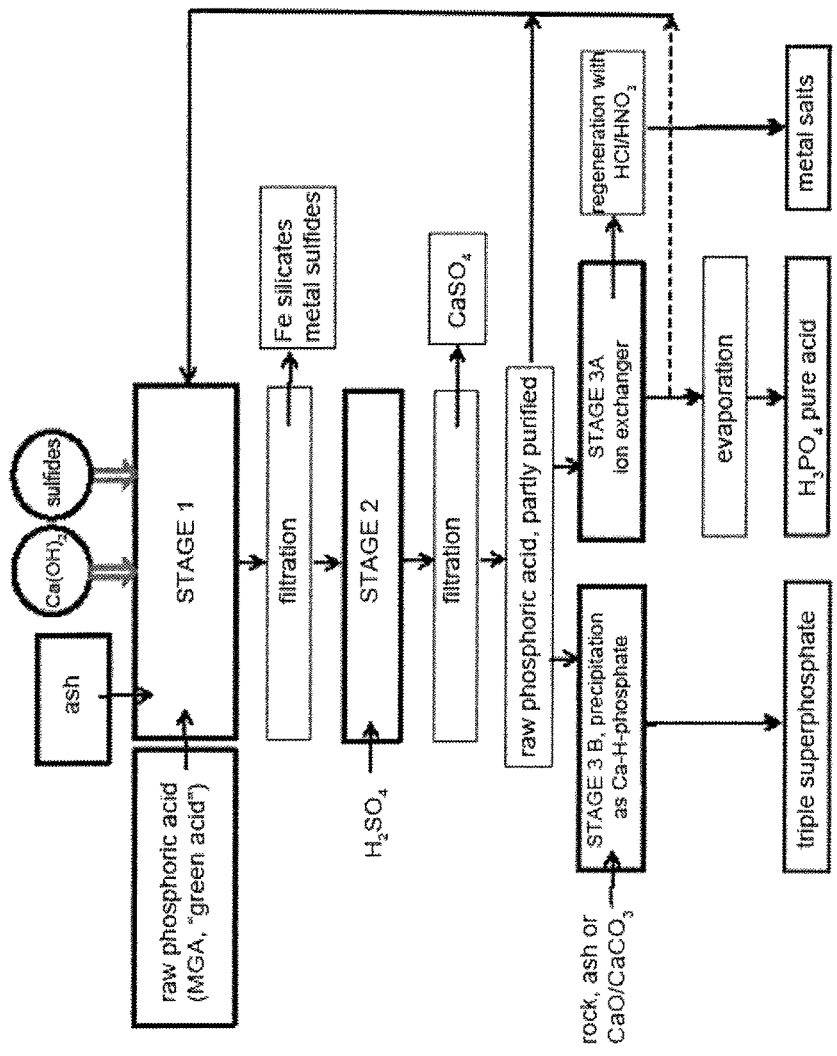
FIG. 2 shows a schematic process sequence of the method according to the invention.

As already described in detail above and illustrated in FIG. 2, the filtrate or eluate (a substantially low-heavy metal raw phosphoric acid), obtained according to the aspect A1, is suitable for further processing or for the subsequent obtaining (producing) of the recyclables contained therein.

The filtrate or the eluate, obtained after the separation of iron silicate and (heavy) metal sulfides, can thus be further applied, e.g. for generation of water-soluble calcium hydrogen phosphates, e.g. fertilizer=triple superphosphate. Optionally, the filtrate or eluate can be further purified by first adding sulfuric acid for forming calcium sulfate precipitate. Interestingly, it has been found that, in addition to calcium oxide and/or calcium carbonate, tricalcium phosphate-containing solids, such as e.g. rock or ashes from animal wastes (animal meal) originating from waste incineration plants, are also suitable for the precipitation of calcium hydrogen phosphate.

In a second aspect A2, the present invention relates thus to a method for purifying raw phosphoric acid, further comprising the obtaining (producing) pure phosphoric acid, metal salts, calcium hydrogen phosphates and calcium sulfate ($CaSO_4$), said method comprising at least obtaining (producing) calcium hydrogen phosphates, e.g. triple superphosphate, characterized in that
  a) raw phosphoric acid is reacted with ash, calcium hydroxide and at least one sulfide,
  b) the acid-insoluble portion of the solids is separated,
  c) optionally, by adding sulfuric acid to the filtrate or eluate a pH value of <1 is adjusted and calcium sulfate precipitate is obtained and separated,
  d) optionally, the filtrate or eluate is at least partially recycled for the use in step a),
  e) by adding tricalcium phosphate-containing solids and/or by adding calcium oxide and/or calcium carbonate to the filtrate or eluate from step b) or c) calcium hydrogen phosphate precipitate is obtained and separated,
  wherein steps a), b) and e) are preferably carried out.

In a further alternative embodiment of the aspect A2, steps a), b), c) and e) are preferably carried out.

In a further alternative embodiment of the aspect A2, steps a), b), c), d) and e) are preferably carried out.

In a further embodiment of the aspect A2, the tricalcium phosphate-containing solid is an ash.

In a preferred embodiment of the aspect A2, the tricalcium phosphate-containing solid is a phosphate-containing ash.

In a further preferred embodiment of the aspect A2, the tricalcium phosphate-containing solid is an ash containing calcium, iron and aluminum compounds in the form of its phosphates and silicates.

In a particularly preferred embodiment of the aspect A2, the tricalcium phosphate-containing solid is an ash originating from the incineration of biodegradable wastes, biowastes, sewage sludges and/or animal wastes in a waste incineration plant.

Alternatively, the filtrate or the eluate obtained after the separation of iron silicate and (heavy) metal sulfides can now be further applied for producing pure phosphoric acid (optionally, the filtrate or the eluate can be further purified by first adding sulfuric acid for forming calcium sulfate precipitate).

In a third aspect A3, the present invention relates thus to a method for purifying raw phosphoric acid, further comprising obtaining (producing) pure phosphoric acid, metal salt solution, calcium hydrogen phosphate and calcium sulfate ($CaSO_4$), said method comprising at least obtaining (generating) pure phosphoric acid, characterized in that
  a) raw phosphoric acid is reacted with ash, calcium hydroxide and at least one sulfide,
  b) the acid-insoluble portion of the solids is separated,
  c) optionally, by adding sulfuric acid to the filtrate or eluate a pH value of <1 is adjusted and calcium sulfate precipitate is obtained and separated,
  d) optionally, the filtrate or eluate is at least partially recycled for the use in step a),
  e) preferably by H-ion exchange resins or by diffusion dialysis the metal ions dissolved in the filtrate or eluate from step b) or c) are removed and the eluate is concentrated, preferably by vacuum evaporation, for obtaining pure phosphoric acid,
  f) optionally, the ion exchange resin is regenerated and the metal salt solution is obtained after step e),
  wherein steps a), b) and e) are preferably carried out.

In a further alternative embodiment of the aspect A3, steps a), b), c) and e) are preferably carried out.

In a further alternative embodiment of the aspect A3, steps a), b), e) and f) are preferably carried out.

In a further alternative embodiment of the aspect A3, steps a), b), c), e) and f) are preferably carried out.

In a further alternative embodiment of the aspect A3, steps a), b), c), d), e) and f) are preferably carried out.

Naturally, it is also possible to carry out the method in a manner, so that calcium sulfate ($CaSO_4$), calcium hydrogen phosphate and/or pure phosphoric acid and metal salt solution can be produced in parallel.

In a fourth aspect A4, the present invention relates thus to a method for purifying raw phosphoric acid, further comprising obtaining (producing) pure phosphoric acid, metal salt solution, calcium hydrogen phosphate and calcium sulfate ($CaSO_4$), characterized in that
  a) raw phosphoric acid is reacted with ash, calcium hydroxide and at least one sulfide,
  b) the acid-insoluble portion of the solids is separated,
  c) optionally, by adding sulfuric acid to the filtrate or eluate a pH value of <1 is adjusted and calcium sulfate precipitate is obtained and separated,
  d) optionally, the filtrate or eluate is at least partially recycled for the use in step a),
  e) preferably by H-ion exchange resins or by diffusion dialysis the metal ions dissolved in the filtrate or eluate from step b) or c) are removed and the eluate is concentrated, preferably by vacuum evaporation, for obtaining pure phosphoric acid,
  f) optionally, after step e) the ion exchange resin is regenerated and the metal salt solution is obtained,
  g) by adding tricalcium phosphate-containing solids and/or calcium oxide and/or calcium carbonate to the filtrate or eluate from step b) or c) calcium hydrogen phosphate precipitate (e.g., triple superphosphate) is obtained and separated,
  wherein steps a), b), c), e), f) and/or g) are preferably carried out.

In a further alternative embodiment of the aspect A4, steps a), b), c), d), e), f) and/or g) are preferably carried out.

In a further alternative embodiment of the aspect A4, steps a), b), c), d), e), f) or g) are preferably carried out.

In a further alternative embodiment of aspect A4, steps a), b), c), d), e), f) and g) are preferably carried out.

When step (d) is carried out in one embodiment of the aspects A2 to A4 and the associated embodiments above, then at least 10% of the filtrate/eluate is preferably recycled for the use in step a), particularly preferably at least 20%, even more preferably 20% to 80%, and most preferably 40% to 60%, based on the total filtrate amount obtained.

In one embodiment of the aspects A1 to A4 and the associated embodiments above, the raw phosphoric acid is contaminated at least with metals.

In a preferred embodiment of the aspects A1 to A4 and the associated embodiments above, the raw phosphoric acid is contaminated with at least heavy metals.

In a further preferred embodiment of the aspects A1 to A4 and the associated embodiments above, the raw phosphoric acid is contaminated with at least one heavy metal, selected from the group consisting of arsenic, cadmium, chromium, copper, nickel or uranium.

In a particularly preferred embodiment of the aspects A1 to A4 and the associated embodiments above, the raw phosphoric acid is "green acid" or "MGA" (Merchand Grade Acid).

In a further embodiment of the aspects A1 to A4 and the associated embodiments above, the raw phosphoric acid is, as defined above, diluted with water to a concentration of 10 wt % to 50 wt % $H_3PO_4$, preferably 10 wt % to 30 wt % $H_3PO_4$.

In a particularly preferred embodiment of the aspects A1 to A4 and the associated embodiments above, the ash is treated with raw phosphoric acid in a reactor, wherein the proportion of ash is between 10 wt % and 75 wt %, based on the diluted raw phosphoric acid.

In a particularly preferred embodiment of the aspects A1 to A4 and the associated embodiments above, the ash is treated with raw phosphoric acid in a reactor, wherein the proportion of ash is between 10 wt % and 55 wt %, based on the diluted raw phosphoric acid.

In a further embodiment of the aspects A1 to A4 and the associated embodiments above, the ash is treated with raw phosphoric acid in a reactor, wherein the proportion of ash is 5 wt % to 50 wt %, preferably 20 wt % to 40 wt %, particularly preferably 20 wt % to 30 wt %, and most preferably 25 wt %, based on the diluted raw phosphoric acid.

In a further embodiment of the aspects A1 to A4 and the associated embodiments above, the reaction time of the reaction of raw phosphoric acid and ash is 2 to 300 minutes, preferably 10 to 60 minutes.

In a further embodiment of the aspects A1 to A4 and the associated embodiments above, the reaction temperature of the reaction of raw phosphoric acid and ash is 20° C. to 90° C., preferably 40° C. to 60° C.

In a further embodiment of the aspects A1 to A4 and the associated embodiments above, the ash is a phosphate-containing ash.

In preferred embodiments of the aspects A1 to A4 and the associated embodiments above, the phosphate-containing ash is obtained by incinerating sewage sludges, biodegradable wastes, bio-wastes and/or animal wastes in waste incineration plants.

In a particularly preferred embodiment of the aspects A1 to A4 and the associated embodiments above, the ash is ash containing calcium, iron and aluminum compounds in the form of their phosphates and silicates.

In a further embodiment of the aspects A1 to A4 and the associated embodiments above, calcium hydroxide and at least one sulfide is added to the ash raw phosphoric acid suspension after 1 to 300 minutes, preferably after 10 to 30 minutes.

In a further embodiment of the aspects A1 to A4 and the associated embodiments above, at least one sulfide in a concentration of 0.1 g to 10 g sulfide sulfur per 100 g of ash is added to the ash raw phosphoric acid suspension.

In a further embodiment of the aspects A1 to A4 and the associated embodiments above, the at least one sulfide is a metal sulfide.

In a further embodiment of the aspects A1 to A4 and the associated embodiments above, the at least one sulfide is a sulfide or polysulfide of alkalis or alkaline earths, or mixtures thereof.

In a preferred embodiment of the aspects A1 to A4 and the associated embodiments above, the at least one sulfide is at least one alkali metal sulfide, selected from the group consisting of lithium sulfide, sodium sulfide and potassium sulfide, or mixtures thereof.

In a preferred embodiment of the aspects A1 to A4 and the associated embodiments above, the at least one sulfide is at least one alkaline earth metal sulfide, selected from the group consisting of magnesium sulfide, calcium sulfide and barium sulfide.

In a particularly preferred embodiment of the aspects A1 to A4 and the associated embodiments above, the at least one sulfide is a sodium sulfide.

In a particularly preferred embodiment of the aspects A1 to A4 and the associated embodiments above, the at least one sulfide is a barium sulfide.

In a particularly preferred embodiment of the aspects A1 to A4 and the associated embodiments above, the at least one sulfide is a mixture of sodium sulfide and barium sulfide.

In a further embodiment of the aspects A1 to A4 and the associated embodiments above, the calcium hydroxide is added in the form of lime milk (calcium hydroxide slurry in water).

In a further embodiment of the aspects A1 to A4 and the associated embodiments above, the lime milk is added up to a pH value of 1.5 to 3.0, preferably 1.5 to 2.0.

In a further embodiment of the aspects A1 to A4 and the associated embodiments above, the insoluble solids are first separated from the ash raw phosphoric acid suspension by filtration technologies (e.g. vacuum-belt filters, filter presses, centrifuges).

In preferred embodiments of the aspects A1 to A4 and the associated embodiments above, the insoluble solids are first removed from the ash raw phosphoric acid suspension using dewatering units (e.g., vacuum belt filter, chamber filter press, membrane filter press, sieve belt press, centrifuge).

In an optional embodiment of the aspects A1 to A4 and the associated embodiments above, optionally, after removing the acid-insoluble solids, 20% to 80%, preferably 40% to 60%, of the filtrate or eluate from step b) or step c) are recycled with respect to the aspects A2 to A4, for the enrichment of calcium for the digestion of the ash.

In a further embodiment of the aspects A2 and A4 and the associated embodiments above, calcium hydrogen phosphate precipitate is obtained and separated by adding tricalcium phosphate-containing solids and/or by adding calcium oxide and/or calcium carbonate to the filtrate or eluate from step b) or c).

In a further embodiment of the aspects A2 and A4 and the associated embodiments above, the calcium hydrogen phosphate precipitate is obtained and separated in the form of a granulate.

In a further embodiment of the aspects A2 and A4 and the associated embodiments above, the calcium hydrogen phosphate precipitate is $Ca(H_2PO_4)_2$ (MCP).

In a further embodiment of the aspects A2 and A4 and the associated embodiments above, the calcium hydrogen phosphate precipitate is $CaHPO_4$ (DCP).

In a further embodiment of the aspects A2 and A4 and the associated embodiments above, the calcium hydrogen phosphate precipitate is a mixture of $Ca(H_2PO_4)_2$ (MCP) and $CaHPO_4$ (DCP).

In a further embodiment of the aspects A2 and A4 and the associated embodiments above, the tricalcium phosphate-containing solid is a raw phosphate, the so-called "rock", preferably in a crushed form, preferably as a powder, bulk material, granular material, semolina etc.

In a further embodiment of the aspects A2 and A4 and the associated embodiments above, the tricalcium phosphate-containing solid is an ash.

In a preferred embodiment of the aspects A2 and A4 and the associated embodiments above, the tricalcium phosphate-containing solid is a phosphate-containing ash.

In a further preferred embodiment of the aspects A2 and A4 and the associated embodiments above, the tricalcium phosphate-containing solid is an ash originating from the incineration of biodegradable wastes, sewage sludges, bio-wastes and/or animal wastes in a waste incineration plant, preferably ash originating from the incineration of animal wastes.

In a particularly preferred embodiment of the aspects A2 and A4 and the associated embodiments above, the tricalcium phosphate-containing solid is an ash containing calcium, iron and aluminum compounds in the form of its phosphates and silicates.

In a further embodiment of the aspects A2 and A4 and the associated embodiments above, after removing the acid-insoluble solids, 20% to 80%, preferably 40% to 60%, of the filtrate or eluate from step b) or step c) are mixed with tricalcium phosphate-containing solids and/or limestone and/or with burnt lime (calcium oxide), for producing calcium hydrogen phosphate precipitate, e.g. triple superphosphate.

In a further embodiment of the aspects A2 and A4 and the associated embodiments above, the tricalcium phosphate-containing solid, preferably animal meal ash, is added in a weight ratio of 0.5 to 2, preferably 0.8 to 1.4, particularly preferably 1, with respect to the proportion of $H_3PO_4$ in the raw phosphoric acid, as defined above.

In a further embodiment of the aspects A2 and A4 and the associated embodiments above, the limestone or the burnt lime is added in a molar ratio of 0.3 to 1.8, preferably 0.7 to 1.5, particularly preferably 0.8 to 1.2 CaO to 2.0 P (phosphorus) to the raw phosphoric acid, as defined above.

In a preferred embodiment of the aspects A2 and A4 and the associated embodiments above, animal meal ash is added as tricalcium phosphate-containing solid in a weight ratio from 0.5 to 2, preferably 0.8 to 1.4, particularly preferably 1, with respect to the proportion of $H_3PO_4$ in the raw phosphoric acid as defined above, also limestone or the burnt lime is added as tricalcium phosphate-containing solid in a molar ratio of 0.3 to 1.8, preferably 0.7 to 1.5, particularly preferably 0.8 to 1.2 CaO to 2.0 P (phosphorus) to the raw phosphoric acid, as defined above.

In a particularly preferred embodiment of the aspects A2 and A4 and the associated embodiments above, animal meal ash is added in a weight ratio of 1 with respect to the proportion of $H_3PO_4$ in the raw phosphoric acid as defined above, and limestone or the burnt lime is added in a mol ratio of 0.8 to 1.2 CaO to 2.0 P (phosphorus) to the raw phosphoric acid, as defined above.

In a further embodiment of the aspects A2 and A4 and the associated embodiments above, the tricalcium phosphate-containing solids or the limestone or the burnt lime is added to a ploughshare mixer or throwing-paddle mixer.

In a further embodiment of the aspects A2 to A4 and the associated embodiments above, calcium sulfate precipitate (gypsum) is obtained and separated by adding sulfuric acid.

In a further embodiment of the aspects A2 to A4 and the associated embodiments above, the sulfuric acid is added in a molar ratio that corresponds to the dissolved calcium concentration of 0.5 Ca to 1.5 $SO_4$ (sulfate), preferably 1.0 Ca to 1.0 $SO_4$ (sulfate).

In a further embodiment of the aspects A2 to A4 and the associated embodiments above, the precipitation of the calcium sulfate precipitate (gypsum) is carried out in a reactor, preferably in a stirred reactor.

In a further embodiment of the aspects A2 to A4 and the associated embodiments above, the residence time in the stirred reactor is 5 to 60 minutes, preferably 10 to 30 minutes.

In a further embodiment of the aspects A2 to A4 and the associated embodiments above, the reaction temperature in the stirred reactor is 20° C. to 90° C., preferably 60° C. to 90° C.

In a further embodiment of the aspects A2 to A4 and the associated embodiments above, the calcium sulfate precipitate (gypsum) is separated by filtration technologies (e.g., vacuum belt filters, filter presses, centrifuges).

In a further embodiment of the aspects A2 to A4 and the associated embodiments above, the calcium sulfate precipitate (gypsum) is separated by mechanical filtration and/or dewatering methods.

In preferred embodiments of the aspects A2 to A4 and the associated embodiments above, the calcium sulfate precipitate (gypsum) is separated using dewatering units, e.g. with vacuum belt filter, chamber filter press, membrane filter press, sieve belt press or centrifuge.

In preferred embodiments of the aspects A2 to A4 and the associated embodiments above, the calcium sulfate precipitate (gypsum) is separated with a vacuum band filter.

In a further embodiment of the aspects A3 and A4 and the associated embodiments above, the filtrate/eluate from step b) or c) is depleted by H-ion exchangers or by dialysis or osmosis of metal ions, preferably aluminum, iron and magnesium ions.

In a preferred embodiment of the aspects A3 and A4 and the associated embodiments above, the filtrate or eluate from step b) is depleted of metal ions, preferably aluminum, iron and magnesium ions, using H ion exchangers.

In a particularly preferred embodiment of the aspects A3 and A4 and the associated embodiments above, the filtrate or eluate from step c) is depleted of metal ions, preferably aluminum, iron and magnesium ions, using H ion exchangers.

In a preferred embodiment of the aspects A3 and A4 and the associated embodiments above, the eluate (diluted sulphuric acid; "Dünnsäure") obtained from the ion exchanger is concentrated by evaporation to an acid content of 40 wt % to 80 wt % $H_3PO_4$, preferably 50 wt % to 70 wt % $H_3PO_4$ (RePacid).

In a preferred embodiment of aspects A3 and A4 and the associated embodiments above, the H-ion exchange resin is regenerated with diluted mineral acids to form a diluted metal salt solution.

In a preferred embodiment of the aspects A3 and A4 and the associated embodiments above, diluted hydrochloric acid, sulfuric acid or nitric acid are used as mineral acids.

In a preferred embodiment of aspects A3 and A4 and the associated embodiments above, the diluted metal salt solution is separated into an acidic metal salt concentrate and a metal-free mineral acid by means of diffusion dialysis.

In a particularly preferred embodiment of the aspects A3 and A4 and the associated embodiments above, the acidic metal salt concentrate contains at least one metal nitrate.

In a further particularly preferred embodiment of the aspects A3 and A4 and the associated embodiments above, the acidic metal salt concentrate contains at least one metal nitrate, selected from the group consisting of aluminum nitrate and iron nitrate.

In a further particularly preferred embodiment of the aspects A3 and A4 and the associated embodiments above, the acidic metal salt concentrate contains at least aluminum nitrate and iron nitrate.

In a further particularly preferred embodiment of the aspects A3 and A4 and the associated embodiments above, the acidic metal salt concentrate, as defined above, is used for the settling/precipitating phosphates dissolved in a liquid, such as metal phosphates.

In a further particularly preferred embodiment of the aspects A3 and A4 and the associated embodiments above, the acidic metal salt concentrate, as defined above, is used for the settling/precipitating phosphates dissolved in the waste water, such as metal phosphates.

In a further particularly preferred embodiment of the aspects A3 and A4 and the associated embodiments above, the precipitation of the phosphates dissolved in the waste water with the acidic metal salt concentrate, as defined above, takes place within a biological denitrification stage of a treatment plant.

In the sense of the invention, the term "rock" refers to any mineral substance, a "raw phosphate", which contains apatite.

In the sense of the invention, the term "raw phosphoric acid" refers to any liquid which contains $H_3PO_4$ in a concentration of at least 10%, preferably at least 25%, and also contains contaminations, preferably contaminations with metals. In particular, for the purpose of the invention, the term "raw phosphoric acid" refers to "merchant grade acid" or MGA, to the so-called "green acid" and other products obtained by treating rock, as defined above, with sulfuric acid.

In the sense of the invention, the term "precipitate" refers to the elimination of a dissolved substance as solid from a solution, usually initiated by additives of suitable substances (precipitants). In particular, the term encompasses any fully or partially insoluble precipitate in form of flakes or crystalline material, in any microcrystalline, crystalline or amorphous form. The term "precipitate" expressly involves any further processing, modification, refining, etc., of precipitates, comprised according to the method of the invention, into powders, fine powders, dusts, bulk material, granular materials, semolina etc.

In the sense of the invention, the term "calcium hydrogen phosphates" encompasses mono-$(Ca(H_2PO_4)_2$ and dicalcium hydrogen phosphate $(CaHPO_4)$, both of which are more water-soluble than the tricalcium phosphate $(Ca_3(PO_4)_2)$ and therefore applied as fertilizers and feedstuffs (feed phosphate). In the form of fertilizers they are also referred to as triple superphosphate (TSP).

In the sense of the invention, the term "ash" refers to any solid residue from the incineration of organic material, for example from sewage sludge, biodegradable wastes, biowastes and/or animal wastes, slaughterhouse wastes, e.g. animal meal. Ash consists mainly of oxides, and silicates of various metals, e.g. $Al_2O_3$, $Fe_2O_3$, MgO, MnO, $P_2O_5$, $P_4O_{10}$, $K_2O$, $SiO_2$, $Na_2SiO_3$, $CaSiO_3$, etc.

In the sense of the invention, the term "phosphate-containing ash" refers to ashes, as defined herein, which contain at least one phosphate, as defined herein.

In the sense of the invention, on the one hand, the term "phosphates" concerns $P_2O_5$ and $P_4O_{10}$. On the other hand, the term "phosphates" refers to the salts and esters of orthophosphoric acid $(H_3PO_4)$, and involves expressly the condensates (polymers) of orthophosphoric acid and their esters. In particular, the term "phosphates" refers to metallic salts of phosphoric acid with the general formula $X(Y)m(PO_4)n$, wherein X and optionally Y is a metal, selected from the group consisting of aluminium, beryllium, bismuth, lead, cadmium, chromium, iron, gallium, indium, potassium, cobalt, copper, magnesium, manganese, molybdenum, sodium, nickel, osmium, palladium, rhodium, ruthenium, strontium, titanium, vanadium, tungsten, zinc, tin.

In the sense of the invention, the term "waste incineration plants" refers to all installations, facilities and the like, which are suitable for incinerating the atmosphere combustible components of any type of waste.

In the sense of the invention, the term "sewage sludge" refers to any suspension of finely dispersed particles of a solid substance in a liquid, preferably to a liquid originating from a waste water treatment plant (sewage plant).

In a preferred embodiment, the liquid, wherein the particles are suspended, is waste water as defined herein.

In the sense of the invention, the term "waste water" relates to all liquids of aqueous nature and/or organic nature, or mixtures thereof, which do not have drinking water quality within the meaning of the Drinking Water Ordinance (TrinkwV) and/or of the national and/or international drinking water standards (e.g. DIN 2000 in Germany). Furthermore, the term waste water comprises all waste water in accordance with § 54 para. 1 of the Water Resources Act (WHG).

In a preferred embodiment, according to the waste water, in the sense of the invention, water can be contaminated or in its properties or its composition modified due to its use. Furthermore, in the sense of the invention, the term "waste water" comprises water, which properties are modified because of domestic, commercial, agricultural or other use and that during dry-weather with it together flowing off water (dirty water) as well as the rainfall flowing off water, which can be collected from the region of built-up or fortified areas (rain water). The leakage and collected liquids originating from facilities for treatment, storage and separation of waste are also considered as waste water. Waste water is domestic waste water from toilets (faecal or black water), sanitary facilities, kitchens and washing machines (washing or grey water), as well as waste water from premises, which are discharged into the public sewage system (commercial or industrial waste water). Heated water from cooling systems counts also as waste water. According to the invention, waste water originating from a variety of purifying and treatment techniques in water treatment plants accounts to as the waste water.

In a particularly preferred embodiment, the sewage sludge occurs as a primary sludge, raw sludge, excess sludge, as treated and/or stabilised sewage sludge (aerobic/anaerobic).

In the sense of the invention, the term "bio-waste" relates to all organic wastes of animal or plant origin, which are generated in a household or factory and can be degraded by microorganisms, soil-living organisms or enzymes. These include for example food remnants and cut grass. As a rule, bio-wastes are collected separately in the so-called organic waste bin and treated separately by composting and fermentation. The resulting compost and the digestate are often recycled into the environment, among others in the horticulture and agriculture. Thus, the term bio-waste comprises both, wastes in accordance with the definition of the EU Waste Framework Directive garden and park wastes, as well as food and kitchen wastes (from households, restaurants, catering industry, retail and processing in the food industry).

In the sense of the invention, the term "biodegradable wastes" comprises besides bio-wastes as defined herein, further also all organic wastes of animal or plant origin from agriculture and forestry that can be degraded by microorganisms, soil-living organisms or enzymes. In particular, this term encompasses all organic wastes of animal or plant origin from agriculture and forestry, which further contain at least one of the following biodegradable materials, selected from the list consisting of wood, paper and cardboard.

In the sense of the invention, the term "animal wastes" comprises animal carcases of changed, dead or stillborn large or domestic animals—or parts thereof—as well as slaughterhouse wastes, spoiled food of animal origin and animal by-products, such as milk, eggs, condemned material but also intestinal content and manure, as well as all further products and generated goods.

In the sense of the invention, the term "animal wastes" comprises in particular meat and animal by-products of domestic animals, wild animals or livestock that have been killed or died due to illness, especially TSE contaminated carcasses and with chemicals or prohibited substances contaminated animals and trial animals.

Furthermore, meat and by-products with the risk of other non-communicable diseases are encompassed.

In the sense of the invention, the term "animal waste" comprises moreover killed, also not slaughtered animals, animal by-products (for example milk), and any animal products containing residues of medicaments. Expressly included are also all wastes and by-products from slaughterhouses, kitchen wastes and food wastes, foods of animal origin that are no longer suitable for human consumption, raw milk, fresh fish or fresh fish by-products. In particular comprised are:
- kitchen and food wastes of any kind,
- fish or other sea animals, as well as fish wastes of any kind,
- former animal-based food products, which are no longer suitable for human consumption for purposes other than health risks, e.g. packaging defects,
- parts of slaughtered animals,
- raw milk,
- shells, hatchery by-products and cracked egg by-products,
- hair, fur, horns, etc.,
- animal wastes from the food industry,
- skins, hooves and horns, pig bristles and feathers originating from animals,
- too long stored meat,
- low-quality meat,
- meat from animals exposed to considerable stress,
- blood of animals (not of ruminants) that were slaughtered in a slaughterhouse after an examination,
- parts of slaughtered animals and animal by-products, which are attributed to the production of human consumption products, degreased bones and greaves, as well as animal meal.

In preferred embodiments of the aspects A1 to A4 and the above associated embodiments, the incineration of sewage sludge, biodegradable wastes, bio-wastes and/or animal wastes is performed in waste incinerator plants at 600° C. to 1200° C., preferably at 800° C. to 900° C.

EXAMPLES

The entire process is described by the following experimental setup:

On the one hand, the starting material is an approximately 70% raw phosphoric acid (MGA acid) originating from North Africa with the following relevant heavy metal contaminations:

| Arsenic | As | 5 |
|---|---|---|
| Cadmium | Cd | 24 |
| Chromium | Cr | 120 |
| Copper | Cu | 46 |
| Nickel | Ni | 24 |
| Uranium | U | 210 |

(All values in mg/kg acid)

On the other hand, the starting material is an ash from a co-incineration plant, wherein sewage sludge has been incinerated with animal wastes. The essential ingredients were analyzed as follows:

| Wt % $P_2O_5$ | 27.0 (corresponds to 11.7% P or 37% $H_3PO_4$) |
|---|---|
| Wt % CaO | 19.6 |
| Wt % $Fe_2O_3$ | 16.3 |
| Wt % $Al_2O_3$ | 5.9 |
| Wt % $SiO_2$ | 25.5 |

100 g ash is treated with 300 g of diluted $H_3PO_4$ in a beaker glass. The diluted acid is composed of 60 wt % water and 40 wt % MAG acid from North Africa. The suspension is stirred for 20 minutes at 45° C. Subsequently, 8 g of lime milk (20% CaO suspension) and 10 g of barium sulfide solution (20% BaS solution) are added and the suspension is filtered through a vacuum-nutsch (with filter) after a further 10 minutes reaction time and washed with 75 g water.

A total of 350 g of filtrate or eluate were recovered and analyzed as follows:

| $H_3PO_4$ | | 33.7 wt % |
|---|---|---|
| CaO | | 3.6 " |
| $Fe_2O_3$ | | 0.6 " |
| $Al_2O_3$ | | 0.8 " |
| Arsenic | As | <1 g/kg |
| Cadmium | Cd | <1 " |
| Chromium | Cr | 19 " |
| Copper | Cu | <1 " |
| Nickel | Ni | 5 " |
| Uranium | U | 40 " |

The thus obtained eluate "RePacid" is about half as concentrated as the used MGA acid. In 350 g eluate, 84 g $H_3PO_4$ are comprised from the MGA acid and 34 g from the ash, a total of 118 g $H_3PO_4$=33.7 wt %. Without the phosphate content from the ash, the $H_3PO_4$ concentration would account only for 24 wt %. The analyzed heavy metal concentrations are in part significantly lower than they would be, when corresponding to a 35% MGA acid, as the following comparison shows:

|  |  | MGA/70% | MGA/35% | Eluate/33.7% |
|---|---|---|---|---|
| Arsenic | As | 5 | 2.5 | <1 |
| Cadmium | Cd | 24 | 12 | <1 |
| Chromium | Cr | 120 | 60 | 19 |
| Copper | Cu | 46 | 23 | <1 |
| Nickel | Ni | 24 | 12 | 5 |
| Uranium | U | 210 | 105 | 40 |

(All values in mg/kg acid)

The eluate obtained in this manner was converted, according to the alternative 1 of the invention, into calcium hydrogen phosphate that is contained in fertilizers as a triple superphosphate, by adding quicklime (CaO) and tricalcium phosphate (from animal meal ash) according to the known reactions:

$$6H_3PO_4 + 3CaO = 3Ca(H_2PO_4)_2 + 3H_2O$$

$$4H_3PO_4 + Ca_3(PO_4)_2 = 3Ca(H_2PO_4)_2$$

According to the stoichiometry, for
6×98=588 g phosphoric acid 3×56 g=168 g calcium oxide are required,
or for 4×98=392 g phosphoric acid 310 g of tricalcium phosphate.
In the example, 33.7 g CaO or 93.3 g $Ca_3(PO_4)_2$ are required for 350 g eluate with 118 g $H_3PO_4$. For the experiment, the following mixture was reacted in a mixer:
350 g RePacid eluate plus
55 g animal meal ash
25 g CaO As a result of the exothermic reaction (extinguishing of quicklime and neutralization heat), a hot granulate was formed which was dried in air and then analyzed as follows:
RePacid Granulate

| $P_2O_5$ |  | 48.6 | wt % |
| CaO |  | 23.8 | " |
| Arsenic | As | <1 | g/kg |
| Cadmium | Cd | <1 | " |
| Chromium | Cr | 35 | " |
| Copper | Cu | 6 | " |
| Nickel | Ni | 10 | " |
| Uranium | U | 38 | " |

Due to the low heavy metal contamination, the calcium hydrogen phosphate, obtained in this manner, is ideally suitable as a triple superphosphate/fertilizer.

According to the alternative 2, the RePacid eluate was freed from the dissolved calcium by the addition of sulfuric acid and subsequently purified with ion exchange resins, so that the purified raw acid could be partially used as a digestion acid, and partially concentrated by vacuum evaporation to about 70% $H_3PO_4$.

500 g of eluate from the $1^{st}$ stage with a Ca content of 3.6% CaO (=18 g CaO) is added to the stoichiometrically required amount of sulfuric acid in a stirred vessel. The amount of sulfuric acid is calculated from the equation:

$$Ca^{2+} + H_2SO_4 = CaSO_4 + 2H^+$$

For 40 g Ca or 56 g CaO, 98 g $H_2SO_4$ are required. For 18 g CaO in 500 g of eluate, 31.5 g $H_2SO_4$ are required. For the example, 63 g of 50% sulfuric acid was added and the resulting calcium sulfate precipitate (gypsum) was filtered and dehydrated, using a vacuum-nutsch after a reaction time of 30 minutes. Thereby, 500 g filtrate (RePecid-raw acid) and 70 g gypsum filter cake were obtained. Subsequently, the raw acid was added dropwise to an acidic H ion exchanger (polystyrene resin beads), wherein a large proportion of the metal ions dissolved in the phosphoric acid, in particular iron ions and aluminum ions, was exchanged for H ions. The RePacid raw and pure acid was analyzed as follows:

|  | $H_3PO_4$ % | Ca g/kg | Mg g/kg | Al g/kg | Fe g/kg |
|---|---|---|---|---|---|
| Eluate (prior $H_2SO_4$ addition) | 33.7% | 36.2 | 3.2 | 4.0 | 4.4 |
| Raw acid (after $H_2SO_4$) | 30.9% | 1.1 | 2.8 | 3.8 | 4.0 |
| Pure acid (after H exchange) | 31.2% | <0.1 | 0.2 | 0.7 | 0.9 |

The pure acid obtained in this manner was, on the one hand, used partly as a digestion acid for dissolving ash, on the other hand, concentrated in a vacuum evaporator at 70° C. to a concentration of 70% $H_3PO_4$ and can be marketed as purified MGA acid RePacid. The resin beads loaded with metal ions were regenerated according to the general state of the art, on the one hand, with diluted hydrochloric acid, alternatively, with diluted nitric acid, wherein the acids were enriched with metal ions in the exchange of H ions (ion exchangers). If the entire process described herein takes place as an additional step for recovering phosphorus from sewage sludge ashes in a sewage sludge incineration plant, the metal-loaded regeneration acid can be used as a precipitant for the phosphates dissolved in the waste water.

What is claimed is:
1. A method for purifying raw phosphoric acid comprising
    a) reacting raw phosphoric acid with ash that is obtained by incinerating phosphate containing sewage sludges, biodegradable wastes, bio-wastes and/or animal wastes in a waste incineration plant, calcium hydroxide and at least one sulfide,
    b) separating the acid-insoluble portion of the solids formed in step a), so that a filtrate or eluate is obtained,
    b2) recovering a filtrate or eluate, comprising phosphoric acid after step b),
    c) adding sulfuric acid to the filtrate or eluate of step b2) to adjust the pH to a value of <1 and to obtain and separate calcium sulfate precipitate; and
    d) recycling at least part of the filtrate or eluate after step c) for use in step a).
2. The method according to claim 1, the method further comprising obtaining pure phosphoric acid, wherein
    e) treating at least part of the filtrate or eluate from step c) to remove the metal ions dissolved therein by H-ion exchange resins, by diffusion dialysis or by vacuum evaporation and the resulting filtrate or eluate is concentrated, for obtaining pure phosphoric acid.
3. The method according to claim 1, the method further comprising obtaining pure phosphoric acid, wherein
    e) treating at least part of the filtrate or eluate from step c) to remove the metal ions dissolved therein by H-ion exchange resins, by diffusion dialysis or by vacuum evaporation and the resulting filtrate or eluate is concentrated, for obtaining pure phosphoric acid,
    f) after step e) the ion exchange resin is regenerated and a metal salt solution is obtained, g) obtaining calcium hydrogen phosphate precipitate by adding tricalcium phosphate-containing solids and/or by adding calcium oxide and/or calcium carbonate to at least a part of the filtrate/eluate from step c).

4. The method according to claim 1, characterized in that the ash is added to raw phosphoric acid in a reactor, wherein the raw phosphoric acid has a concentration of 10 wt % to 50 wt % $H_3PO_4$, and wherein the portion of ash is 5 wL % Lo 50 wt %, based on the diluted raw phosphoric acid.

5. The method according to claim 1, characterized in that the raw phosphoric acid is merchant grade acid (MGA).

6. The method according to claim 1, wherein the phosphoric acid and raw ash form an ash-raw phosphoric acid suspension and calcium hydroxide and at least one sulfide are added to the ash-raw phosphoric acid suspension after 1 to 300 minutes, wherein the at least one sulfide is selected from sulfides or polysulfides of alkalis or alkaline earths, or mixtures thereof, wherein at least one sulfide is added in a concentration of 0.1 g to 10 g sulfide sulfur per 100 g ash.

7. The method according to claim 1, characterized in that the calcium hydroxide is added to the ash-acid suspension up to a pH value of 1.5 to 3.0.

8. The method according to claim 1, wherein the ash is a tricalcium phosphate-containing solid.

9. The method according to claim 2, the method further comprising obtaining metal salt solution, calcium hydrogen phosphates and calcium sulfate, characterized in that
f) after step e) the ion exchange resin is regenerated and a metal salt solution is obtained,
g) obtaining calcium hydrogen phosphate precipitate by adding tricalcium phosphate-containing solids and/or by adding calcium oxide and/or calcium carbonate to at least a part of the filtrate/eluate from step c).

10. The method according to claim 4, characterized in that the raw phosphoric acid is merchant grade acid (MGA).

11. The method according to claim 5, wherein the phosphoric acid and raw ash form an ash-raw phosphoric acid suspension and calcium hydroxide and at least one sulfide are added to the ash-raw phosphoric acid suspension after 1 to 300 minutes, wherein the at least one sulfide is selected from sulfides or polysulfides of alkalis or alkaline earths, or mixtures thereof, wherein at least one sulfide is added in a concentration of 0.1 g to 10 g sulfide sulfur per 100 g ash.

12. The method according to claim 6, characterized in that the calcium hydroxide is added to the ash-acid suspension up to a pH value of 1.5 to 3.0.

13. The method according to claim 3, wherein the ash is a tricalcium phosphate-containing solid.

14. The method according to claim 7, wherein the ash is a tricalcium phosphate-containing solid.

15. The method according to claim 2, wherein the step e) is performed by vacuum evaporation.

16. The method according to claim 2, further comprising
f) after step e) the ion exchange resin is regenerated and the metal salt solution is obtained.

17. The method according to claim 4, characterized in that the ash is added to raw phosphoric acid in a reactor, wherein the raw phosphoric acid has a concentration of 10 wt % to 30 wt % $H_3PO_4$, and wherein the portion of ash is 20 wt % to 30 wt %, based on the diluted raw phosphoric acid.

18. The method according to claim 6, wherein the phosphoric acid and raw ash form an ash-raw phosphoric acid suspension and calcium hydroxide and at least one sulfide are added to the ash-raw phosphoric acid suspension after 10 to 30 minutes, wherein the at least one sulfide is selected from sulfides or polysulfides of alkalis or alkaline earths, or mixtures thereof, wherein at least one sulfide is added in a concentration of 0.1 g to 10 g sulfide sulfur per 100 g ash.

19. The method according to claim 7, characterized in that the calcium hydroxide is added to the ash-acid suspension up to a pH value of 1.5 to 2.0.

\* \* \* \* \*